Patented Feb. 7, 1933

1,896,224

UNITED STATES PATENT OFFICE

HENRY DREYFUS, OF LONDON, ENGLAND

MANUFACTURE OF ACETIC ACID

No Drawing. Application filed May 27, 1926, Serial No. 112,166, and in Great Britain June 13, 1925.

This invention relates particularly to the production of acetic acid from mixtures of or containing hydrogen and carbon monoxide.

I have found that by employing suitable catalysts such as hereinafter referred to, while employing the hydrogen and carbon monoxide in suitable relative proportions in the gas or gaseous mixture taken, say in a proportion of about one molecule of hydrogen to one molecule of carbon monoxide, it is possible to obtain acetic acid under the action of heat and pressure.

It is understood that I do not confine myself closely to these relative proportions of carbon monoxide and hydrogen and that the same may be varied within certain limits.

Catalysts which may be employed for this purpose are such as are capable of combining the gases together and at the same time either are themselves capable of or contain or are associated with additional catalytic substances capable of forming acetates which decompose with the formation of acetic acid at temperatures usually under about 400° C. but in any case not above 450° C. preferably between about 200° and 300° C. Such catalysts or catalytic mixtures may be employed alone or in mixture with other catalysts, but in any case they must be capable of or be associated with catalytic substances capable of splitting off acetic acid. By employing such catalysts or catalyst mixtures the gases can be combined and acetic acid be split off or evolved continuously, with regeneration of the catalysts.

It is possible that formaldehyde may be formed intermediately which is transformed into acetic acid.

Catalysts which favour the production of methane or more than traces of methane are to be avoided.

Some catalysts which may be employed for the purposes of the invention, are for example copper oxide, tin oxide, lead oxide, copper acetate, aluminium methylate, tin methylate and like methylates, or mixtures of two or more of any of the foregoing with each other, or mixtures of any of them with basic materials such as potassium acetate or sodium acetate. Mixtures of or containing one or more of the foregoing, for instance, the said metal methylates, with one or more alkali methylates such as potassium methylate or sodium methylate, may also be used. Other catalysts or catalyst mixtures having a similar effect may however be employed, but, as already indicated, basic catalysts (which conduce to the formation of methyl alcohol as main product) should only be used in conjunction with non-basic catalysts such as the metal compounds previously specified.

In carrying out the process one may employ temperatures which are usually below about 350° C. but may in some cases be as high as 400° or 450° C. and preferably between about 200° and 300° C., and pressures which may be up to 200 atmospheres or more, variable according to the catalysts used, but generally pressures of about 50 to 150 atmospheres.

What I claim and desire to secure by Letters Patent is:—

1. A process for the manufacture of acetic acid, which comprises subjecting a gaseous mixture containing about one molecule of hydrogen relatively to one molecule of carbon monoxide to the action of heat and superatmospheric pressure at a temperature between 100° and 450° C. in presence of a contact mass containing at least one non-basic catalyst selected from the group consisting of metal acetates which decompose with the formation of acetic acid at a temperature not exceeding 450° C., and metal compounds capable of forming said acetates.

2. A process for the manufacture of acetic acid, which comprises subjecting a gaseous mixture containing about one molecule of hydrogen relatively to one molecule of carbon monoxide to the action of heat and superatmospheric pressure at a temperature between 200° and 300° C. in presence of a contact mass containing at least one non-basic catalyst selected from the group consisting of metal acetates which decompose with the formation of acetic acid at a temperature not exceeding 450° C., and metal compounds capable of forming said acetates.

3. A process for the manufacture of acetic acid, which comprises heating a gaseous mixture containing about one molecule of hydrogen relatively to one molecule of carbon monoxide under a pressure between 50 and 150 atmospheres at a temperature between 100° and 450° C. in presence of a contact mass containing at least one non-basic catalyst selected from the group consisting of metal acetates which decompose with the formation of acetic acid at a temperature not exceeding 450° C., and metal compounds capable of forming said acetates.

4. A process for the manufacture of acetic acid, which comprises heating a gaseous mixture containing about one molecule of hydrogen relatively to one molecule of carbon monoxide under a superatmospheric pressure not exceeding 200 atmospheres and at a temperature between 100° and 450° C. in presence of a contact mass containing at least one non-basic catalyst selected from the group consisting of metal acetates which decompose with the formation of acetic acid at a temperature not exceeding 450° C., and metal compounds capable of forming said acetates.

5. A process for the manufacture of acetic acid, which comprises heating a gaseous mixture containing about one molecule of hydrogen relatively to one molecule of carbon monoxide under a pressure between 50 and 150 atmospheres, and at a temperature between 200° and 300° C. in presence of a contact mass containing at least one non-basic catalyst selected from the group consisting of metal acetates which decompose with the formation of acetic acid at a temperature between 200° and 300° C., and metal compounds capable of forming said acetates.

In testimony whereof I have hereunto subscribed my name.

HENRY DREYFUS.